UNITED STATES PATENT OFFICE.

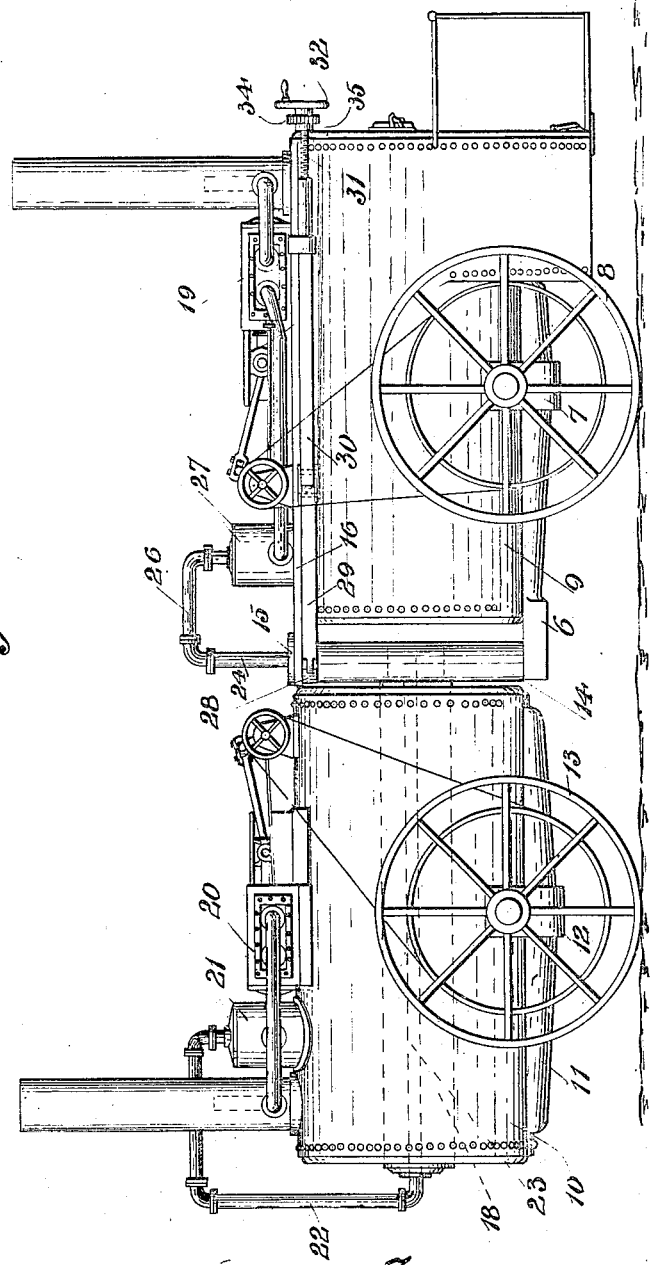

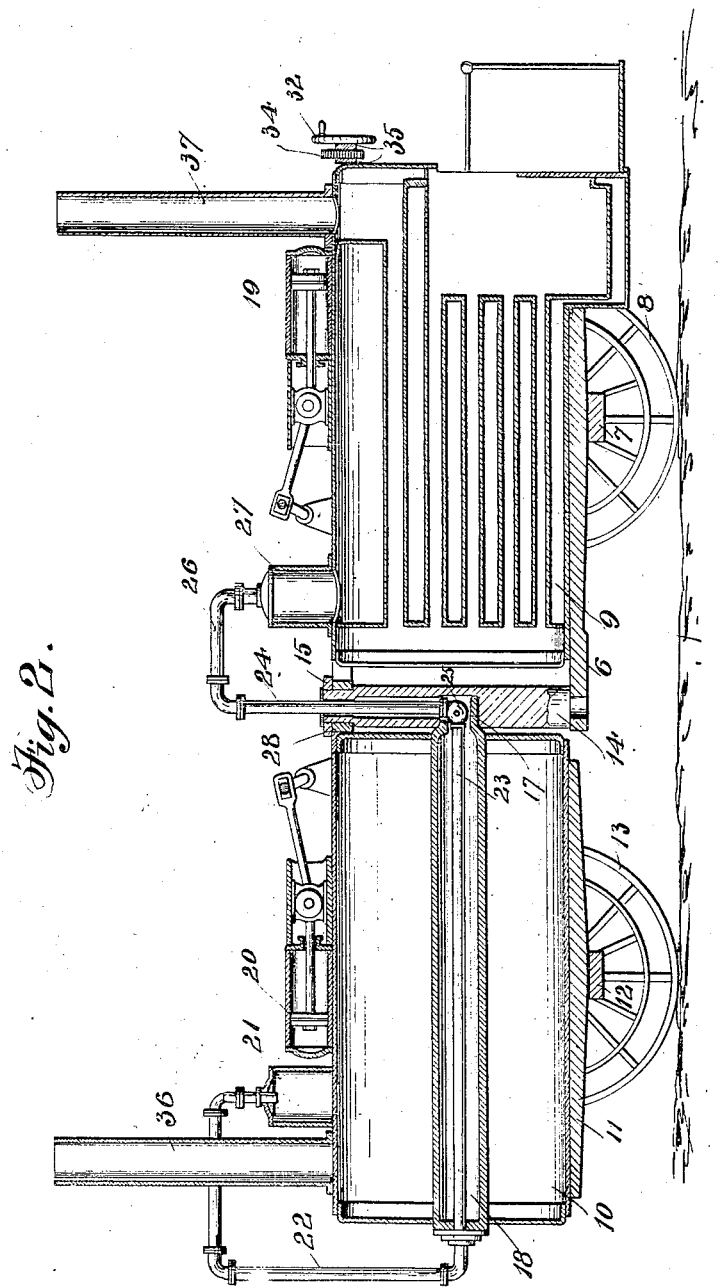

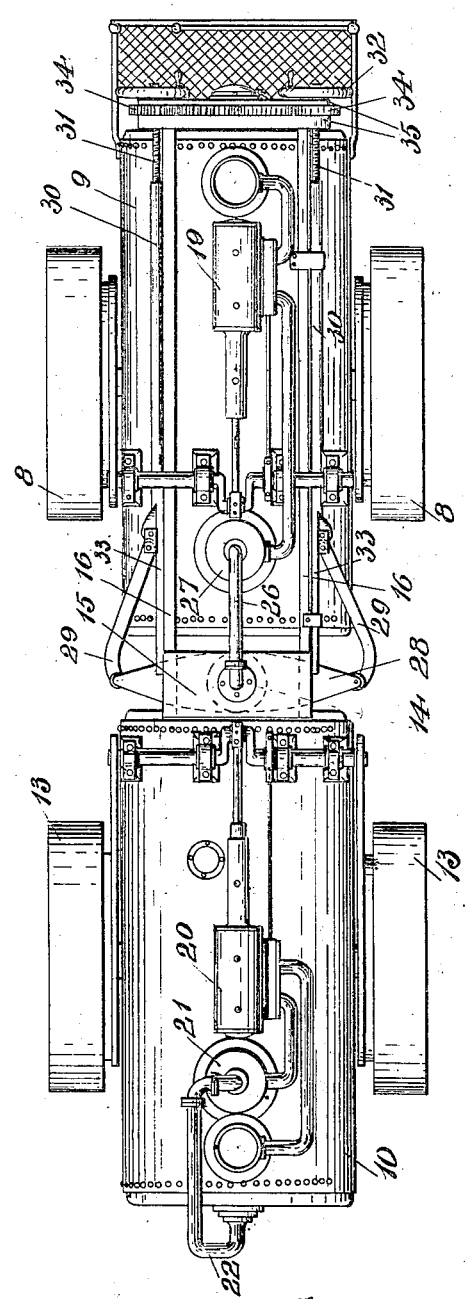

FREDERICK IDDO CASS, OF CLINTONVILLE, WISCONSIN.

TRACTION-ENGINE.

No. 883,934.  Specification of Letters Patent.  Patented April 7, 1908.

Application filed July 17, 1907. Serial No. 384,181.

*To all whom it may concern:*

Be it known that I, FREDERICK IDDO CASS, a citizen of the United States, residing at Clintonville, in the county of Waupaca and State of Wisconsin, have invented certain new and useful Improvements in Traction-Engines, of which the following is a specification.

This invention relates to traction engines, and has for its particular object to provide improved means for supporting and driving such an engine.

A further object of the invention is to provide improved means for steering the same.

The ordinary traction engine has most of the weight on the rear wheels, and drives by said wheels alone. The present engine has a driving gear or motor for each set of wheels, and is so constructed that the water tank is supported upon the front wheels and the boiler upon the rear wheels, and with a motor or engine, as stated, for each set of wheels. Novel connections are provided between the boiler and the engine on the tank. Also novel steering mechanism for turning the front or tank carriage or truck, for the purpose of steering the vehicle.

The invention is illustrated in the accompanying drawings, in which

Figure 1 is a side elevation of the vehicle. Fig. 2 is a vertical longitudinal section. Fig. 3 is a top plan view.

Referring specifically to the drawings, 6 indicates a platform or wide sill, which is mounted upon the arched axle 7 supported by wheels 8. This platform or sill supports the steam boiler 9 which may be of any desired construction. The boiler is balanced as near as possible, upon the truck formed by the axle and wheels.

The water tank 10 is supported upon the front truck consisting of the sill 11, axle 12, and wheels 13, and is balanced as nearly as possible thereon.

A flexible or universal connection between the tank truck and the boiler truck is formed by means of a pivot post 14 of large diameter. This is located at the front end of the boiler and is pivotally mounted at its lower end upon the projecting end of the sill 6. At the upper end it finds a bearing in a cross piece 15 supported by the ends of a pair of beams 16 extending lengthwise along the top of the boiler and securely fastened thereto. This post provides a vertical axis, which permits the tank truck and boiler truck to be turned with respect to each other, as in rounding a curve.

In order to allow the tank truck to vary its lateral vertical angle with respect to the boiler truck, the post 14 has a hollow tube 18 projecting forwardly therefrom and extending through an axial tube or cylinder 17 within the tank 10. The tube 17 bears upon the tube 18, and so they can turn with respect to each other, to allow the lateral inclination of the respective axles to be varied, as is necessary in passing over rough roads.

A steam engine 19 is mounted upon the steam boiler and is connected by belts or other suitable gearing to the wheels 8, and a steam engine 20 is likewise mounted upon the water tank 10, and is belted or geared to the wheels upon which said tank is supported. This gives a power drive at both trucks or sets of wheels. The engine on the steam boiler has the usual steam connections with the boiler. The engine on the front tank has a supply connection from the steam dome 21 which is mounted on said tank for the purpose of supplying said engine with dry steam. Said dome receives steam from the steam boiler 9 through connections including a pipe 22 which extends forwardly from the steam dome and downwardly in front of the tank, a pipe 23 which extends axially through the tube 18, a pipe 24 which is connected by a universal joint 25 to the pipe 23, and a pipe 26 connected to the steam dome 27 on the boiler. The connections shown are provided in order that metallic pipes may be used throughout, and so that angular variations in any direction between the front and rear trucks will not break the connections.

Steering is effected by turning the post 14, which allows the angle of the front and rear trucks to be varied. To this end the post has a cross bar 28 at the top, the ends of which are connected by links 29 to sleeves 30 on screws 31 which are provided with hand wheels 32. These parts are duplicated at opposite sides of the machine, and the hand wheels are placed at the rear of the steam boiler so as to be readily accessible to the driver on either side. The sleeves 30 are mounted in guides 33 on the beam 16, and the screws 31 are geared together by spur wheels 34 so that the screws turn in unison but in opposite directions, and so pull or push oppositely when the device is being steered. The screws are held against lengthwise movement in bearings in cross beams 35 at the rear end of the steam boiler, and consequently when the screws are turned the sleeves 30 are moved one way or the other thereby turning the post 14 one way or the other, by means of the connecting links 29 and arms 28. When the post is turned the angle of the rear truck with respect to the front truck is varied, as above described.

By the construction shown, the weight of the necessary parts of a steam traction engine are placed upon four wheels, all of which are used for driving purposes, with a driving engine for each pair. The exhaust from the front engine is through a stack 36 and from the rear engine is through the usual smoke stack 37.

I claim:

1. In a traction engine, the combination of front and rear trucks, flexibly connected together, a water tank upon one truck and a steam boiler upon the other, a driving engine mounted upon each truck to drive the same, and having connections to the boiler, and means to steer the trucks.

2. In a traction engine, the combination of two-wheeled front and rear trucks, a turning steering post at the front end of the rear truck and having a connection to the front truck arranged to turn the same when the post is turned, means to turn the post, and means carried by the trucks to drive the same.

3. In a traction engine, the combination of a two-wheeled front truck, a cylindrical water tank mounted thereon and having a central horizontal bearing tube, a rear truck, a steam boiler mounted thereon, a turning steering post mounted on the front end of the rear truck and having a rigid projecting tube extending forwardly into said bearing tube, whereby the tank may turn in a vertical plane with respect to the boiler, and said front truck swing in a horizontal plane to change the direction of travel, and steam engines mounted on and connected to the trucks to drive the same.

4. In a traction engine, the combination of a two-wheeled front truck, a cylindrical water tank mounted thereon and having a horizontal axial tube, a rear truck, a steam boiler mounted thereon, a hollow turning post on the rear truck and having a forwardly-projecting tube bearing in said tube, a steam engine mounted upon and having driving connections to the front truck, and a pipe extending from the boiler through said post and tubes and to the engine and having a flexible coupling, and means to turn the post to steer the trucks.

5. In a traction engine, the combination of a front truck, a rear truck, a turning post on the rear truck and connected to the front truck to turn the same, said post having a projecting arm, a threaded tube connected to said arm, and a steering screw extending into said tube, to move the same.

In testimony whereof I affix my signature, in presence of two witnesses.

FREDERICK IDDO CASS.

Witnesses:
R. G. GIBSON,
MILES O. CASS.